United States Patent
Waltenberg et al.

(10) Patent No.: US 9,689,356 B2
(45) Date of Patent: Jun. 27, 2017

(54) FILTER DEVICE, IN PARTICULAR FOR GAS FILTRATION

(71) Applicant: MANN+HUMMEL GMBH, Ludwigsburg (DE)

(72) Inventors: Klaus Waltenberg, Grossbottwar (DE); Daniel Schmid, Sachsenheim (DE); Norbert Strassenberger, Adlkofen (DE); Matthias Krohlow, Herrenberg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 188 days.

(21) Appl. No.: 14/627,606

(22) Filed: Feb. 20, 2015

(65) Prior Publication Data

US 2015/0167601 A1    Jun. 18, 2015

Related U.S. Application Data

(63) Continuation of application No. PCT/EP2013/067424, filed on Aug. 22, 2013.

(30) Foreign Application Priority Data

Aug. 22, 2012  (DE) .................. 10 2012 016 557
Aug. 22, 2012  (DE) .................. 20 2012 012 669 U

(51) Int. Cl.
*F02M 35/024*   (2006.01)
*B01D 46/24*    (2006.01)
*B01D 46/00*    (2006.01)

(52) U.S. Cl.
CPC ... *F02M 35/02416* (2013.01); *B01D 46/0004* (2013.01); *B01D 46/0005* (2013.01);
(Continued)

(58) Field of Classification Search
CPC ............ B01D 46/0004; B01D 46/0005; B01D 46/2411; B01D 46/2414; B01D 2265/021;
(Continued)

(56) References Cited

U.S. PATENT DOCUMENTS

2003/0121242 A1   7/2003  Rieger et al.
2012/0198802 A1   8/2012  Menssen

FOREIGN PATENT DOCUMENTS

DE   202007002906 U1   7/2008
DE   102008063720 A1   6/2010
(Continued)

*Primary Examiner* — Robert Clemente
(74) *Attorney, Agent, or Firm* — James Hasselbeck

(57) ABSTRACT

A filter device with filter housing and housing cover has a filter element disposed therein. A first holding part on the filter element projects past an outer wall surface of the filter element. A second holding part in the form of a counter holding part on the housing cover interacts with the first holding part. The first and second holding parts engage each other in a mounted state of the filter element. A first form-fit part is arranged on the filter element axially spaced from the first holding part and is associated with a second form-fit part in the form of a counter form-fit part. The first form-fit part and the first holding part, by rotational movement of the filter element about a longitudinal axis of the filter element, are each transferable into a form-fit engaged state with the counter holding part and the counter form-fit part, respectively.

12 Claims, 5 Drawing Sheets

(52) U.S. Cl.
CPC ... *B01D 46/2414* (2013.01); *F02M 35/02483* (2013.01); *B01D 2265/022* (2013.01)

(58) Field of Classification Search
CPC ........ B01D 2265/022; B01D 2265/026; F02M 35/02416; F02M 35/02483
See application file for complete search history.

(56) References Cited

FOREIGN PATENT DOCUMENTS

| | | | |
|---|---|---|---|
| EP | 1839723 | A1 | 10/2007 |
| EP | 2236187 | B1 | 10/2010 |

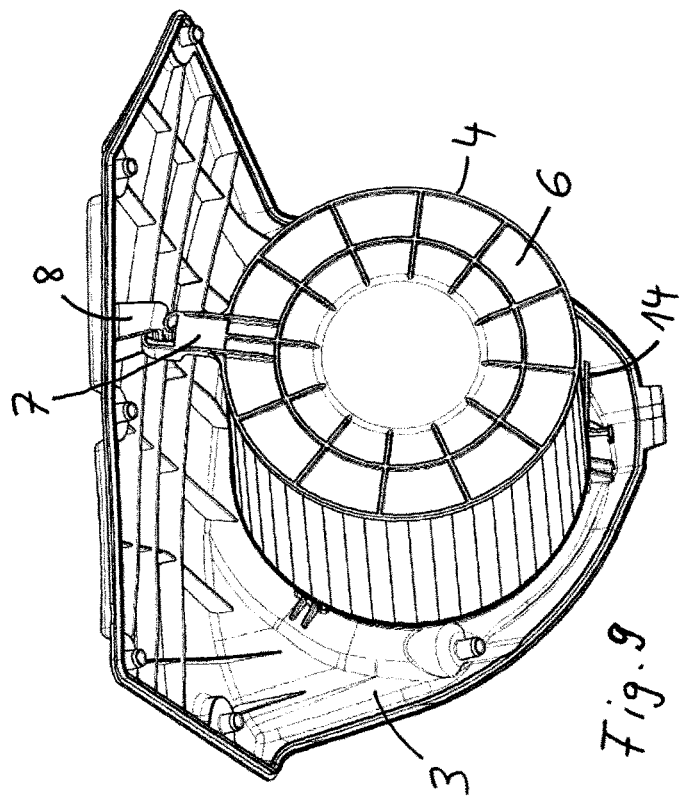
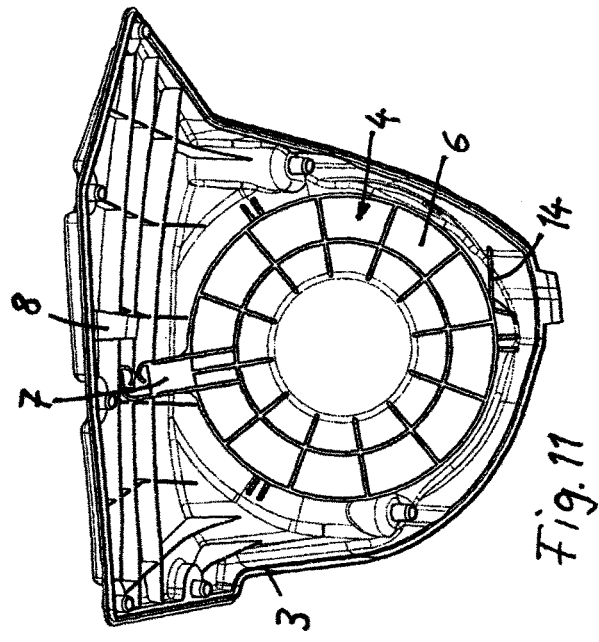
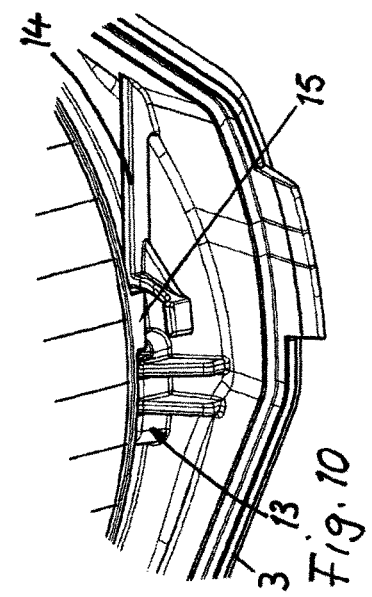
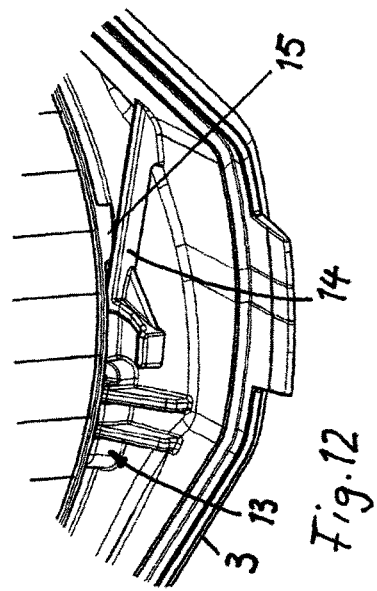

FILTER DEVICE, IN PARTICULAR FOR GAS FILTRATION

CROSS-REFERENCE TO RELATED APPLICATIONS

This application is a continuation application of international application No. PCT/EP2013/067424 having an international filing date of 22 Aug. 2013 and designating the United States, the International Application claiming a priority date of 22 Aug. 2012, based on prior filed German patent application No. 20 2012 012 669.5, and further claiming a priority date of 22 Aug. 2012, based on prior filed German patent application No. 10 2012 016 557.9, the entire contents of the aforesaid international application and the aforesaid two German patent applications being incorporated herein by reference.

BACKGROUND OF THE INVENTION

The invention concerns a filter device, in particular for gas filtration, for example, an air filter for internal combustion engines, comprising a filter element that is received in a filter housing which is closable by a housing cover, wherein on the filter element a holding part is arranged that projects past the outer wall surface and has correlated therewith a counter holding part on the housing cover and the holding parts engage each other in the mounted state. The invention concerns also a filter element receivable in the filter device.

Air filters for motor vehicles for filtration of the combustion air to be supplied to an internal combustion engine of a vehicle are known. Such an air filter as described, for example, in DE 20 2005 020 099 U1, comprises a hollow-cylindrical filter element which is flowed through radially from the exterior to the interior by the combustion air to be purified, wherein the clean air is discharged axially. The filter element is received in a filter housing and, according to DE 20 2005 020 099 U1, is secured by a clamping and locking action on a counter holder on the inner side of the housing cover by means of a holding part, which is formed monolithically with an end-face end disk of the filter element and is projecting radially past the wall surface of the filter element. In this context, the holding part during the insertion movement of the filter element is axially locked with the counter holder.

Comparable embodiments are also disclosed in WO 2011/104107 A1, DE 10 2011 120 073 B3, and U.S. Pat. No. 7,604,677 B2.

SUMMARY OF THE INVENTION

The invention has the object to configure a filter device with simple constructive measures such that the filter element is securely held and can be exchanged in a simple way.

This object is solved according to the invention in that on the filter element, at an axial spacing to the holding part, a form-fit part is arranged that has correlated therewith a counter form-fit part, wherein the form-fit part and holding part by means of a rotational movement about the longitudinal axis of the filter element are transferable into a form-fit engaged state. The dependent claims provide expedient further embodiments.

The filter device according to the invention is used for filtration of a fluid, in particular a gas, wherein optionally also liquid media can be filtered. Preferably, the filter device according to the invention is used as an air filter for motor vehicles, in particular for an internal combustion engine or for the fresh air to be supplied to the interior of the motor vehicle.

In the mounted state, the filter element received in the filter device is secured on at least one location on the filter housing cover. A second location is provided either on the filter housing or also on the filter housing cover.

In one embodiment with a fixation of the filter element exclusively in the housing cover, tolerances and relative movements between housing and cover can be disregarded when designing the element fixation so that a narrower tolerance configuration of the connecting devices and the sealing device between filter element and housing cover is possible. In a service situation, the filter element, held within the cover, can be removed from the housing in a simple way. Removal of the filter element from the cover is possible in a simple way outside of the installation environment of the air filter device.

The filter device comprises a filter element that can be flowed through by the fluid to be purified and is received in a filter housing which can be closed off by a housing cover. On the filter element, a holding part is arranged that projects past the outer wall surface of the filter element and has correlated therewith a counter holding part on the housing cover. In the mounted state, the holding parts on the filter element and on the housing cover engage each other so that a first holding or fixation point for holding the filter element on the housing cover is provided.

Moreover, the filter element comprises a further connecting location relative to the housing or the housing cover. This is realized by means of a form-fit part that is arranged with axial spacing relative to the holding part on the filter element and has correlated therewith a counter form-fit part. The counter form-fit part is located preferably on the housing cover wherein optionally also an arrangement of the counter form-fit part on the filter housing is conceivable. As a result of the axial spacing between the holding part and the form-fit part that are both arranged on the filter element, the filter element is secured by two different axially spaced apart connecting locations on the housing or on the housing cover.

For holding and locking the filter element on the housing cover or filter housing, a rotational movement about its longitudinal axis is imparted onto the filter element. The rotational movement of the filter element transfers the holding part as well as the form-fit part on the filter element into the locking position in which both parts are form-fittingly engaging the correlated counter holding part or counter form-fit part provided on the housing or on the cover. The form fit on the holding part as well as on the form-fit part is thus produced by the same rotational movement about the longitudinal axis of the filter element. In a corresponding way, form fit for removal of the filter element from the housing cover or filter housing can be canceled again by a rotational movement in the opposite direction.

The filter element is preferably embodied to be hollow-cylindrical and is flowed through radially from the exterior to the interior by the fluid to be purified. The externally positioned wall surface forms the raw side, the interior the clean side from which the purified fluid is discharged axially. For insertion and mounting, the filter element is moved axially into its mounting position and subsequently rotated about its longitudinal axis so far that the holding part and the form-fit part on the filter element move into form-fit position with the correlated counter holding part or counter form-fit part on the housing cover or filter housing. In this connection, it may be expedient to embody at least one of the locking devices like a bayonet closure in which, during the rotational movement, parts on the filter element and on the housing cover or filter housing lock form-fittingly with each other in such a way that form fit is provided in axial direction. For example, the form-fit part on the filter element can be designed as a bayonet closure. It is however also possible, additionally or alternatively, to lock the holding part like a bayonet closure on the housing cover or filter housing.

According to a further expedient embodiment, the filter element on at least one axial end face, optionally on both axial end faces, is provided with an end disk, respectively, that is comprised, for example, of plastic material and is connected fixedly with the filter medium of the filter element. The end disks can be supports of the holding part and/or of the form-fit part on the filter element; optionally, the holding part and/or form-fit part is formed monolithically with the respective end disk. In this context, the holding part projects radially past the wall surface of the filter element while the form-pit part does not mandatorily project radially past the wall surface of the filter element but optionally is positioned within the wall surface and projects only in axial direction past the surface of the end disk. The form-fit part is, for example, designed as a pocket which optionally is arranged at the axial end face of the end disk wherein the counter form-fit part on the housing or the cover is provided with a locking element that upon rotational movement of the filter element moves into the pocket. The counter form-fit part has for this purpose a contour that is complementarily embodied to the pocket on the filter element and that moves circumferentially into the pocket that is open at one end, wherein the rotational movement is limited in that the counter form-fit part impacts on the inner wall at the other end of the pocket.

Alternatively, the form-fit part can be embodied on an end disk as a contour, for example, in the form of hooks, which complementarily engages counter form-fit parts that are designed as pockets.

The holding part on the filter element can be formed as a locking hook which is projecting radially past the filter element and in the mounted position projects into a locking tab which forms the counter holding element on the housing cover. In this context, it can be expedient that, on the locking hook, at least one elastic springy contact part is formed that in the mounted state loads the locking tab on the housing cover with a clamping force so that the locking hook is held securely at the locking tab. The elastic springy contact part is in particular formed monolithic with the locking hook. In an alternative embodiment, the holding part on the filter element can be designed as a locking tab while a locking hook is embodied on the housing or housing cover.

In order to prevent accidental release of the filter element by return rotation about the longitudinal axis of the filter element, according to a further advantageous embodiment an elastic snap lever is provided at the housing or the cover which is resting in the mounted state on a locking projection at the circumferential side of the filter element. The snap lever can be arranged on the inner side of the housing cover or optionally also immediately on the filter housing. The snap lever which is advantageously formed monolithic with the housing cover or the filter housing acts elastically in radial direction and projects with a clamping force radially into the locking projection on the circumferential side of the filter element. In the mounted state a release of the filter element is precluded in this way. The latter can be removed only once the snap lever has been manually bent open elastically so that the snap lever is disengaged from the locking projection on the circumferential side of the filter element and the filter element can be rotated back so far about its longitudinal axis that the form fit between holding part and counter holding part as well as between form-fit part and counter form-fit part is canceled; subsequently, the filter element can be removed axially.

In an alternative embodiment, an elastic snap lever is provided on the end disk which in the mounted state locks at a locking projection on the inner side of the housing cover or of the housing. The snap lever which is advantageously formed monolithic with the end disk acts elastically in radial direction and projects with a clamping force radially into the locking projection on the housing wall or the housing cover wall.

BRIEF DESCRIPTION OF THE DRAWINGS

Further advantages and expedient embodiments can be taken from the additional claims, the figure description and the drawings.

FIG. 9 shows the housing cover with inserted filter element in the locked state.

FIG. 10 shows in an enlarged view a snap hook which is formed monolithic with the housing cover, wherein the snap hook is resting on a locking projection at the circumferential side of the filter element.

FIG. 11 is an illustration in accordance with FIG. 9 but with the filter element in the released state.

FIG. 12 is an illustration according to FIG. 10 with the snap hook in the open state.

In the Figures, same components are provided with same reference characters.

DESCRIPTION OF PREFERRED EMBODIMENTS

Figure 1A:
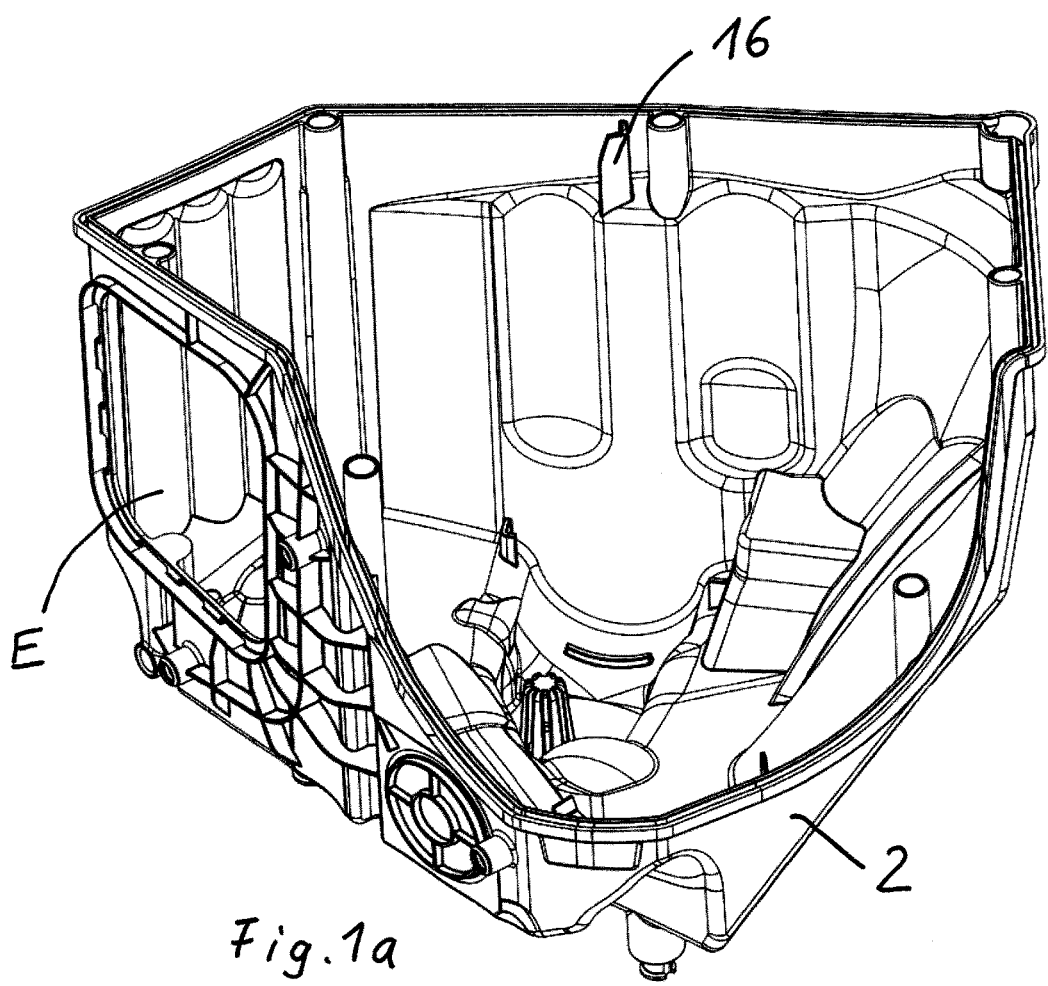
FIG. 1a shows in a perspective individual illustration an air filter housing for an internal combustion engine of a vehicle.
Figure 1B:
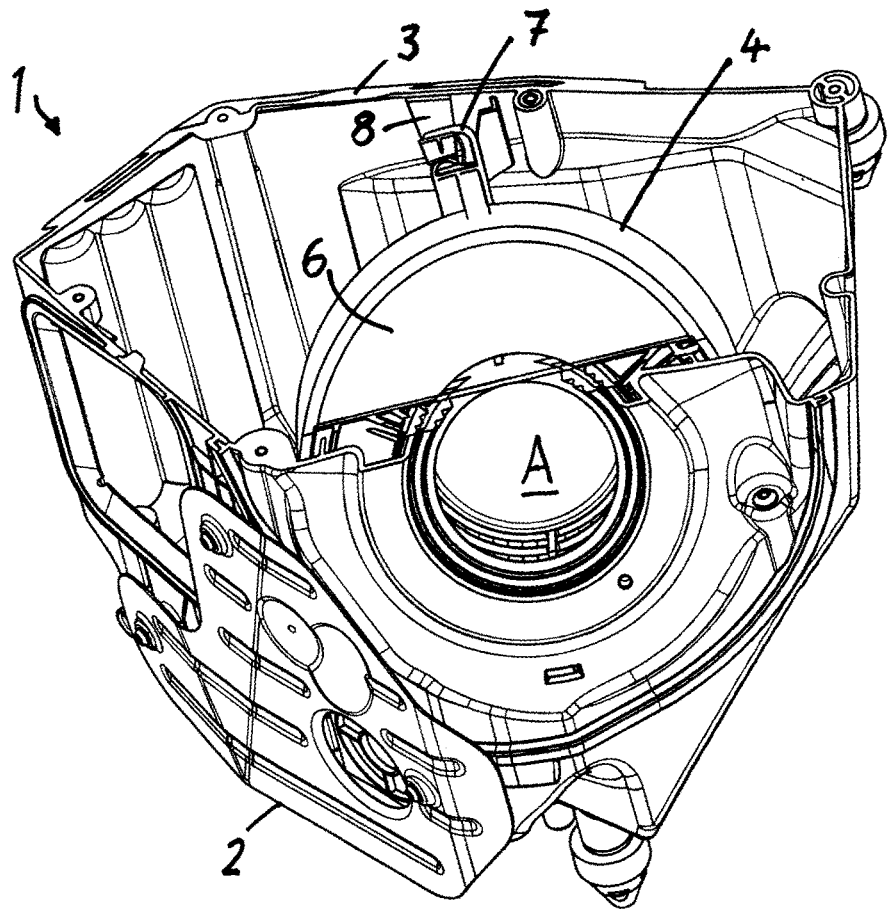
FIG. 1b shows in a perspective illustration a horizontal section of an air filter with a hollow-cylindrical filter element that is secured with form fit on the filter housing cover (illustrated only partially).

In the Figures, an air filter for the internal combustion engine of a motor vehicle is illustrated as an embodiment. The filter device 1 embodied as an air filter comprises a hollow-cylindrical filter element 4 in a filter housing 2 (FIG. 1a) which is flowed through by the fluid to be purified radially from the exterior to the interior. The air to be purified flows through a lateral inlet E into the air filter housing 2. The discharge of the purified fluid is realized axially via the inwardly positioned clean chamber through the outlet A of the housing cover 3 (FIG. 1*b*). The filter element 4 is secured by axially spaced apart holding and form-fit elements on a housing cover 3 which is attachable to the filter housing 2.

Figure 2:
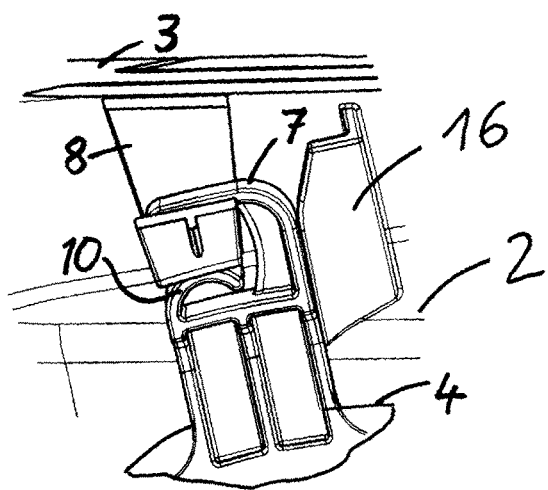
FIG. 2 shows in an enlarged illustration a holding part on the filter element which is embodied as a locking hook and is projecting into a locking tab on the inner side of the housing cover.

As can be seen in FIG. 1*b* in connection with FIG. 2, a holding part 7 is located on an end face of the filter element 4 and is provided in particular monolithic with an end disk 6 of plastic material that is attached to the end face of the filter medium of the filter element 4. The holding part 7 is designed as a locking hook which is projecting radially past the wall surface of the filter element 4. The holding part 7 has correlated therewith a counter holding part 8 which is designed as a locking tab and is arranged on the inner side of the housing cover 3. On the holding part 7 elastic springy contact parts 10 are integrally formed which in the mounted state press against the counter holding part 8 and in this way provide for an increased frictional connection between holding part 7 and counter holding part 8. As can be seen in FIG. 2 together with FIGS. 3 and 4, on the holding part 7 on the filter element 4 two elastic springy contact parts 10 are formed between which the counter holding part 8 is received. Upon placement of the housing cover 3 onto the filter housing 2, a securing rib 16 on the filter housing 2 secures the connection against release.

Figure 5:
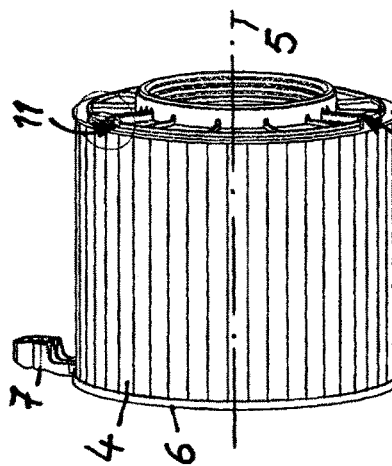
FIG. 5 shows the filter element in a side view.
Figure 4:
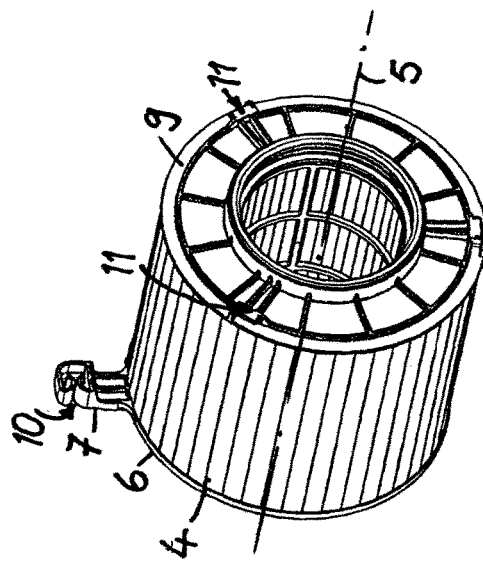
FIG. 4 shows the filter element in perspective view looking onto the end disk with clean air outlet.
Figure 3:
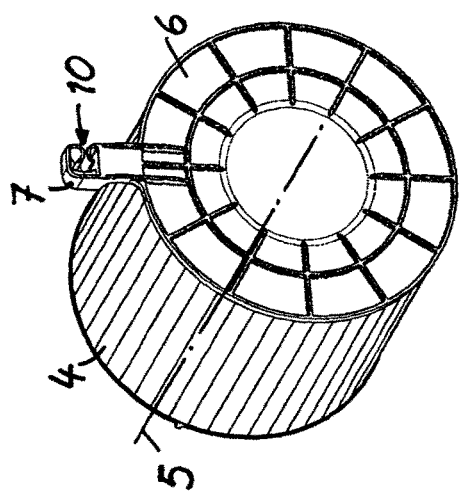
FIG. 3 shows the filter element in perspective view looking onto the closed end disk.

In FIGS. 3 to 5, the filter element 4 is illustrated in different perspective views. The filter element 4 is hollow-cylindrical and has a longitudinal axis 5. At the end faces, the filter element 4 is framed by an end disk 6 or 9, respectively.

Figure 6:
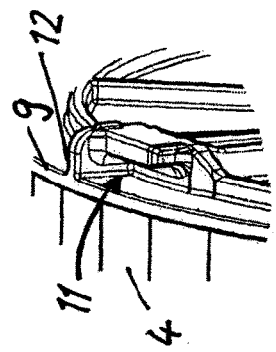
FIG. 6 is an enlarged illustration of a form-fit part that is embodied as a pocket on one of the end faces of the filter element.

The holding part 7 is embodied monolithic with a first end disk 6 on the filter element 4 and projects, in particular in radial direction, past the outer wall surface of the filter element. In the area of the oppositely positioned end disk 9, there are a total of three form-fit parts 11 uniformly distributed about the circumference which are formed monolithic with this end disk and, as can be seen in the enlarged illustration according to FIG. 6, are designed pocket-shaped. Each pocket-shaped form-fit part 11 on the filter element 4 is limited in circumferential direction by a wall while the side of the pocket 11 which is positioned opposite the circumferential wall is embodied to be open. This makes it possible that a complementarily formed counter form-fit part 13 (FIGS. 7, 8) at the inner side of the housing cover 3 can move via the open side of the pocket 11 into the latter until it hits the circumferential wall 12.

Accordingly, in the area of both axially oppositely positioned end faces of the filter element 4, holding or form-fit parts 7, 11 are provided which, upon rotational movement of the filter element 4 about its longitudinal axis 5, move into a form-fit connection with the correlated counter holding part 8 or counter form-fit part 13 on the housing cover 3. In the area of the end disk 6 there is only a single holding part 7 while in the area of the oppositely positioned end disk 9 a total of three form-fit parts 11 uniformly distributed about the circumference are provided. Accordingly, as shown in FIG. 7, on the inner side of the housing part 3 a total of three counter form-fit parts 13 uniformly distributed about the circumference are provided also.

Figure 8:
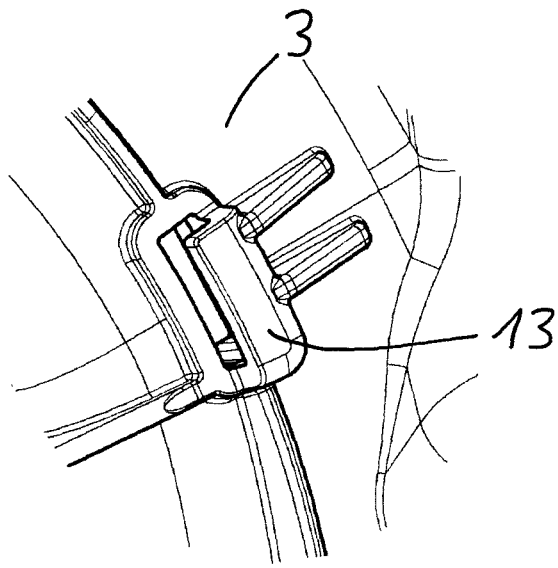
FIG. 8 shows in an enlarged illustration a counter form-fit part on the inner side of the housing cover.

The counter form-fit part 13 on the inner side of the housing cover 3, as can be seen in the enlarged illustration according to FIG. 8, is embodied as an axially projecting and circumferentially extending projection which is inserted into the pocket 11 with the rotational movement upon mounting of the filter element.

Figure 7:
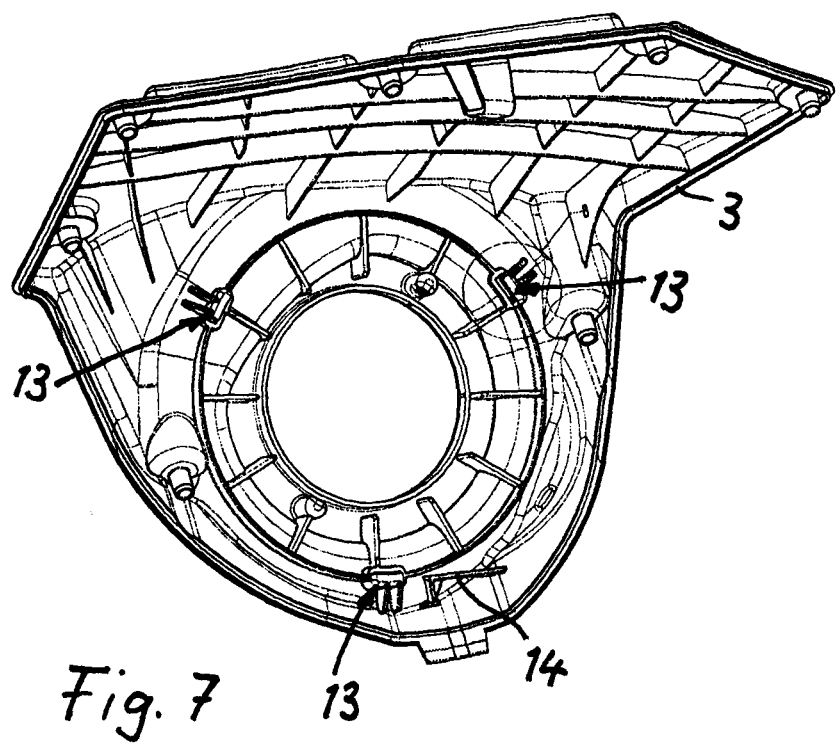
FIG. 7 is a perspective individual illustration of the housing cover.

As can be seen in FIG. 7 together with FIGS. 9 through 12, on the inner side of the housing cover 3 an elastic springy snap lever 14 is formed which in radial direction of the filter element 4 is springy and secures the mounted filter element 4 in its locked rotational position. On the circumferential side of the end disk 6 on the filter element 4, there is a locking projection 15 (FIGS. 10, 12) on which the snap lever 14 is resting lockingly when the filter element 4 is closed or locked. Accordingly, in the closed position of the filter element 4 (FIGS. 9, 10), the rotational position of the filter element is secured and an accidental release of the filter element is precluded.

For removal of the filter element 4 from the housing cover 3, the snap lever 14 must be manually moved out of its locked position radially outwardly so that the snap lever 14 is disengaged from the locking projection 15 and the locking form fit in circumferential direction is canceled. Subsequently, the filter element 4 can then be rotated back about its longitudinal axis until the form-fit part 11 disengages the counter form-fit part 12 and the holding part 7 also disengages the counter holding part 8. Subsequently, the filter element 4 can be removed axially.

The insertion of the filter element 4 into the housing cover 3 is realized in the reverse sequence wherein the snap lever 3 will locked automatically. Accordingly, the filter housing cover 3 and filter element 4 form a unit that is easy to handle and can be simply joined with the filter housing 2 to a filter device 1. Upon installation of the unit of filter housing cover/filter element in the filter housing 2, the housing-fast securing rib 16 additionally secures the connection of holding part 7 and counter holding part 8 because, due to the interaction of holding part 7 and securing rib 16, a rotational movement of the filter element 4 about its longitudinal axis is prevented.

The fixation of the filter element 4 in the air filter is realized in the illustrated embodiment exclusively in the filter housing cover 3. Accordingly, component tolerances and component movements in operation and component changes due to heat and moisture between filter housing 2 and filter housing cover 3 must not be taken into consideration in designing the attachment and sealing action of the filter element 4.

While specific embodiments of the invention have been shown and described in detail to illustrate the inventive principles, it will be understood that the invention may be embodied otherwise without departing from such principles.

What is claimed is:
1. A filter device comprising:
 a filter housing;
 a housing cover closing off the filter housing;
 a filter element disposed in the filter housing;
 the filter element comprising:
  a first end disk arranged at an axial end face of the filter element, the first end disk having central opening for flow to enter or exit the filter element;
  a second end disk arranged on an opposing axial end face of the filter element and defining a longitudinal axis extending centrally through the central opening and the second end disk;
  a first holding part arranged on the second end disk and projecting past an outer wall surface of the filter element;
 a second holding part in the form of a counter holding part arranged on the housing cover and adapted to interact with the first holding part,
 wherein the first holding part and the second holding part engage each other in a mounted state of the filter element in the filter device;

the filter element comprising
- a first form-fit part at an axial spacing to the first holding part and having associated therewith a second form-fit part in the form of a counter form-fit part;

wherein the first form-fit part and the first holding part, by a rotational movement of the filter element about the longitudinal axis of the filter element relative to the housing cover results in
- a) a form-fit engagement of the first holding part with the counter holding part; and
- b) a form-fit engagement of the first form-fit part with the counter form-fit part;

securely mounting the filter element in the filter device.

2. The filter device according to claim 1, wherein
the filter element is hollow-cylindrical and the outer wall surface is a cylindrical wall surface,
wherein the first holding part projects radially past the cylindrical wall surface.

3. The filter device according to claim 2, wherein
the first holding part is arranged on the first end disk.

4. The filter device according to claim 3, wherein
the first form-fit part is arranged on the second end disk of the filter element.

5. The filter device according to claim 1, wherein
the counter form-fit part and the counter holding part are arranged on the housing cover.

6. The filter device according to claim 1, wherein
several of said first form-fit part are provided and distributed about a circumference of the filter element but axially positioned at a same height of the filter element, the several of said first form-fit part formed as a radially outwardly extending projections on the second end disk;
wherein the form fit parts engage corresponding circumferentially spaced into counter form-fit parts formed as receiving pockets on the housing cover into which respective ones of the radially outwardly extending projections are received when the filter element is rotated about the longitudinal axis.

7. The filter device according to claim 1, wherein
the first form-fit part is configured as a bayonet closure.

8. The filter device according to claim 1, further comprising
an elastic snap lever arranged on the housing cover,
wherein the filter element comprises a locking projection at a circumferential side of the filter element,
wherein the snap lever is resting in the mounted state on the locking projection.

9. The filter device according to claim 1, wherein
the first holding part is a locking hook and the counter holding part is provided on the housing cover and is a locking tab,
wherein the locking hook is a C-shaped locking hook having an opening of the C-shape for receiving the locking tab, the locking hook having a first springy contact part spaced apart from a second springy contact part, the first and second spring contact parts arranged at the opening of the C-shaped locking hook to against engage opposing sides of the counter holding part within the C-shaped locking hook.

10. The filter device according to claim 9, wherein
the locking hook comprises an elastic springy contact part that loads the locking tab on the housing cover when the filter element is in the mounted state.

11. A filter element comprising
a first end disk arranged on axial end face of the filter element, the first end disk having central opening;
a second end disk arranged on an opposing axial end face of the filter element, defining a longitudinal axis extending through the first and the second end disk;
a holding part arranged on the second end disk and projecting past an outer wall surface of the filter element and further comprising
a form-fit part arranged on the first end disk at an axial spacing relative to the holding part,
wherein the filter element is adapted to be inserted into a filter housing to be closed off by a housing cover,
wherein the holding part and the form fit part are configured such that by rotation of the filter element about the longitudinal axis:
- a) the holding part is configured to engage form-fittingly a counter holding part provided on the housing cover; and
- b) the form-fit part is configured to engage form-fittingly a counter form-fit part provided on the housing cover.

12. The filter element according to claim 11, wherein
the holding part is a C-shaped locking hook having an opening of the C-shape for receiving the counter holding part, the locking hook having a first springy contact part spaced apart from a second springy contact part, the first and second spring contact parts arranged at the opening of the C-shaped locking hook to against engage opposing sides of the counter holding part within the C-shaped locking hook.

* * * * *